Figure 1:
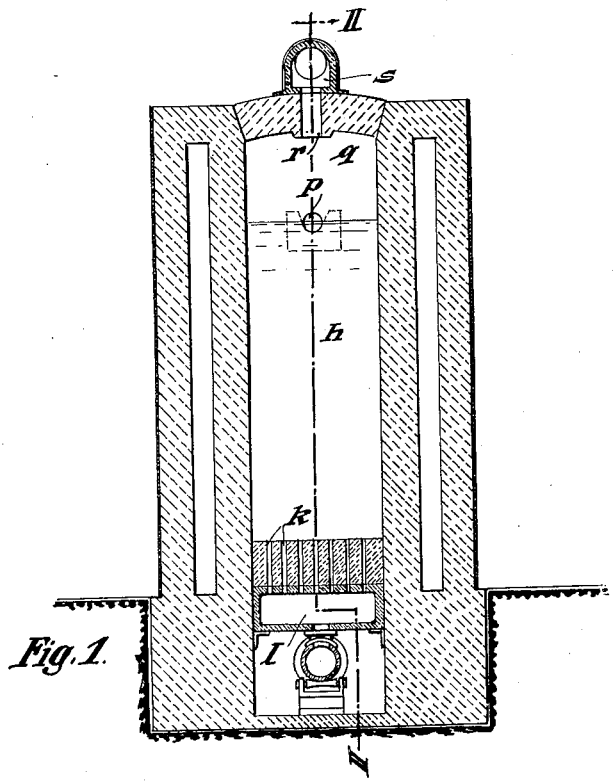

Nov. 20, 1928.  1,692,175

J. KERSTEN

FURNACE FOR THE DECOMPOSITION OF ALKALI METAL CHLORIDES

Filed Sept. 19, 1924

Patented Nov. 20, 1928.

1,692,175

UNITED STATES PATENT OFFICE.

JULIUS KERSTEN, OF BENSHEIM, GERMANY.

FURNACE FOR THE DECOMPOSITION OF ALKALI-METAL CHLORIDES.

Application filed September 19, 1924, Serial No. 738,654, and in Germany October 6, 1923.

This invention has for its object an economical carrying out of the commonly known process of decomposition of alkali metal chlorides by steam in which a molten mass of alkali metal chloride and of a silicate, as potassium silicate or sodium silicate is prepared which contains the silicic acid in the soluble state and which is capable of depositing alkali metal oxide. Steam is added to this molten mass. In this manner hydrochloric acid is obtained as by-product besides the alkali metal silicate.

Example: $2NaCl + H_2O + Na_2O \times 2SiO_2 = 2HCl + 2(Na_2O \times SiO_2)$.

According to the invention one proceeds in the following manner: To the molten mass of alkali metal chloride and silicate, carbon, for instance graphite or charcoal is added in solid form which dissolves colloidally in the mass and, besides the steam, air is further injected into the mass whereby in the interior of the mass combustion of a portion of the carbon and consequently the complete transmission to the mass of the heat produced is obtained, another portion of the carbon serving to produce by the decomposition of the steam the generation of free hydrogen. The process is in detail as follows:—

1. 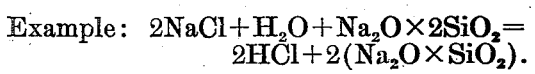 $4NaCl + 2H_2O = 2Na_2O + 4HCl$.

The steam, superheated as much as possible, is injected and the quantity of heat is generated by the combustion of a part of the added carbon by the air which is required to decompose the alkali metal chloride and to maintain the mass in the molten state during the decomposition, another portion of the carbon reacts with the steam, thus:—

2. $C + H_2O = CO + H_2$.
   $C + 2H_2O = CO_2 + 2H_2$.

The hydrogen which has thus been liberated decomposes the chloride more easily than the steam according to the parallel process in Example 1, forming hydrochloric acid and alkali metal which, when being generated, acts upon the steam and causes, besides the formation of alkali metal oxide, the retransformation of the hydrogen, thus:—

3. 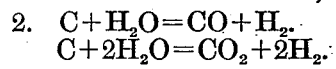 $4NaCl + 2H_2 = 4HCl + 2Na_2$.
   $2Na_2 + 2H_2O = 2Na_2O + 2H_2$.

The alkali metal oxide produced according to Examples 1 and 3 combines in the main process in the desired manner with the silicates to form the desired alkali metal salt.

In certain cases the direct inner heating of the molten mass by means of air injected for combustion of the carbon may be dispensed with, an external heating of the converter or an intense heating, for instance gas heating, being employed. In this case the above-stated chemical action of the carbon takes place also.

For carrying out the process according to the invention an apparatus of the type shown by way of example on the accompanying drawing is preferably used.

Fig. 1 illustrates in longitudinal section and

Figure 2:
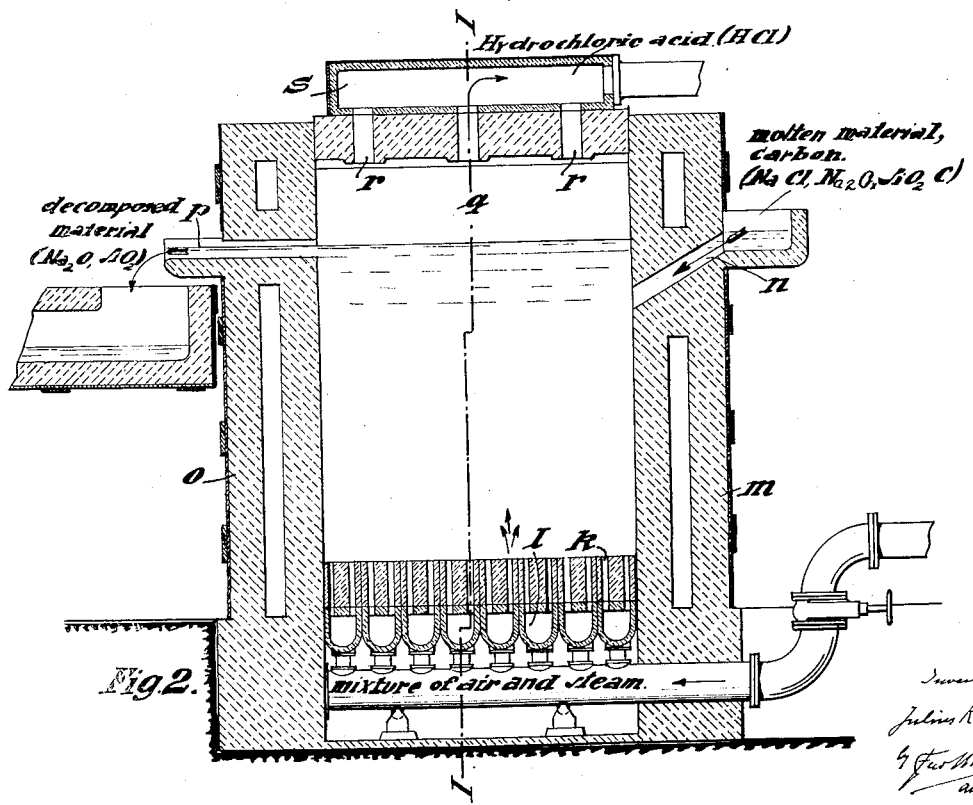

Fig. 2 in cross section a furnace working without interruption.

The furnace shown in the drawing is constructed in such a manner that the initial substances are charged into the same continuously preferably in molten state, the product from decomposition flowing off from the oven automatically in accordance with the supply of these substances. In this manner the decomposing process is rendered continuous. The substances are charged in this furnace in molten state into a single chamber through which they flow to be exposed to decomposition. The liquid product from decomposition flows out from this chamber automatically in accordance with the quantity of initial substances fed into the oven.

This furnace of very simple construction consists of a chamber $h$ similar to a shaft having a grate-like bottom plate $k$ the slits of which form injecting nozzles for steam and air. Below this bottom plate $k$ boxes $l$ are arranged through which the steam and the air are conducted to the nozzles either together or separately.

In the end wall $n$ of the furnace a channel $n$, or several such channels, is arranged which is downwardly inclined and terminates in the chamber $h$. The molten material coming from the melting furnace is charged through this channel $n$ continuously into the chamber $h$. In the opposite end wall $o$ of the furnace a second channel $p$ (or several such channels) is arranged which is horizontal and situated on a higher plane than the channel $n$. Through channel $p$ the decomposed material flows continuously out in a quantity which corresponds with the fresh charge fed into the chamber $h$ through the channel $n$. The chamber $h$ is thus constantly filled up to the height of channel $p$. As the inflow channel $n$ is situated on a lower plane than the outflow channel $p$ the fresh molten material flows always into the substances contained in the chamber $h$.

In the top plate $q$ of the furnace outlet ports $r$ are arranged through which the hydrochloric acid flows continuously over into a collector $s$ from which it can be withdrawn with the aid of any suitable means.

I claim:

A furnace for the decomposition of alkali metal chlorides by steam in the presence of silicates in a molten mass, comprising in combination a shaft enclosed by masonry, a grate like bottom plate in said shaft and having slits which form injecting nozzles, air boxes and steam boxes under said grate like bottom plate, means for connecting said boxes with said grate like bottom plate to supply air and steam to said slits, a collector for the escaping gases at the top end of said shaft, a permanently open inlet channel for the supply of the molten mass at the one side of said shaft at about the middle height of said shaft, and a permanently open outflow channel at the other side of said shaft at the height of the liquid level in said shaft and designed for discharging the products from decomposition, a top plate on said shaft and having outlet ports, and a collector above said top plate designed to collect the hydrochloric acid which is generated so that the initial materials with addition of carbon are continuously charged into the furnace and the products from decomposition are continuously discharged from the same.

In testimony whereof I affix my signature.

Dr. JULIUS KERSTEN.